Jan. 23, 1968  P. MAUGUEN ET AL  3,365,079
APPLICATION OF SAID METHOD HOT CELL HAVING
A THIN DIAPHRAGM AND METHOD OF MAINTAINING
A FLAT SURFACE ON SAID DIAPHRAGM
Filed Sept. 8, 1964  3 Sheets-Sheet 1

INVENTORS
PIERRE MAUGUEN
ANDRÉ VALENTIN
BY Bacon & Thomas
ATTORNEYS

United States Patent Office 3,365,079
Patented Jan. 23, 1968

3,365,079
APPLICATION OF SAID METHOD HOT CELL HAVING A THIN DIAPHRAGM AND METHOD OF MAINTAINING A FLAT SURFACE ON SAID DIAPHRAGM
Pierre Mauguen, Montfermil, Seine-et-Oise, and André Valentin, Paris, France, assignors to Commissariat à l'Energie Atomique, Paris, France
Filed Sept. 8, 1964, Ser. No. 394,709
Claims priority, application France, Sept. 27, 1963, 948,950
2 Claims. (Cl. 214—1)

This invention relates to a method for endowing a thin diaphragm with a flat surface and to the products obtained as a result of the application of said method or a like method.

When a thin diaphragm or membrane such as a metallic sheet, for example, is loaded either uniformly or locally, it is subjected to a deflection which is a function of the distribution and weight of the load. In certain applications, it is necessary to ensure that this deflection is reduced to a minimum or practically zero.

A large number of means have been employed in order to achieve this result; among these can be mentioned the use of reinforcements arranged either crosswise or transversely or alternatively an increase in thickness of the diaphragm. Such reinforcements are permanently fixed on the diaphragm and therefore create discontinuities in its thickness. However, in certain applications, for example in the case of transmission of a force through a diaphragm by means of a magnetic flux, it is necessary to ensure that the thickness of the diaphragm is as small as possible and also as constant as possible.

It has also been proposed to make use of a device consisting of two frames, the size of which corresponds to that of the diaphragm to be stretched. One of the frames is provided opposite the lateral portions of the diaphragm with a portion which is inclined to the axis. The other frame is intended during the attachment thereof to the first frame to force back the lateral portions along said portion so as to put the diaphragm under tension and then to clamp the diaphragm in position. This solution is attended by a number of disadvantages which, in particular, prevent high tensile values inasmuch as, on the one hand, accidental slackening-off is liable to occur as a result of slipping of the diaphragm between the two frames and, on the other hand, any inequalities in the proximity of the two frames are liable to result in clamping defects.

The aim of the present invention is to provide a method which meets practical requirements more effectively than the methods of the prior art, particularly insofar as it serves to ensure surface flatness of a diaphragm while permitting said diaphragm to retain a constant thickness.

The method according to the invention consists in subjecting a frame having a shape which corresponds to the contour of the diaphragm to stresses which tend to shrink said frame, in rigidly fixing the edge of the diaphragm to said frame, in then reducing to zero the stresses applied on the frame so that the frame tends to revert to its initial shape and applies tractive efforts along the edge of the diaphragm.

A clearer understanding of the invention will be gained by perusal of the description which now follows, reference being made to the accompanying drawings in which one mode of application of the invention is shown by way of example without any limitation being implied.

Figure 1:
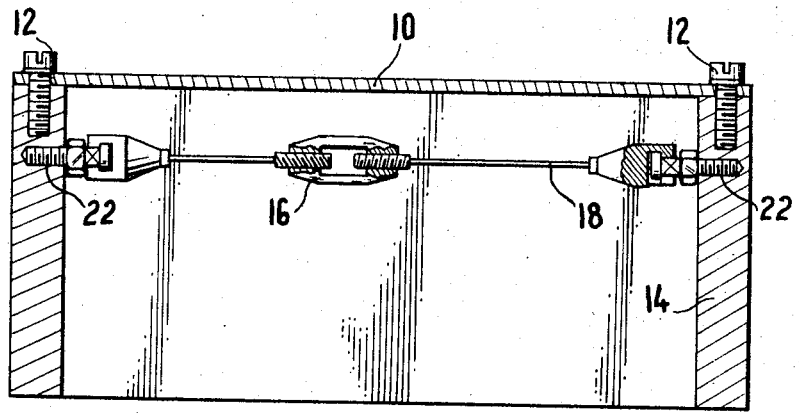
FIG. 1 is a view in cross-section of a plate and of the frame which supports this latter, as shown during assembly.
Figure 2:
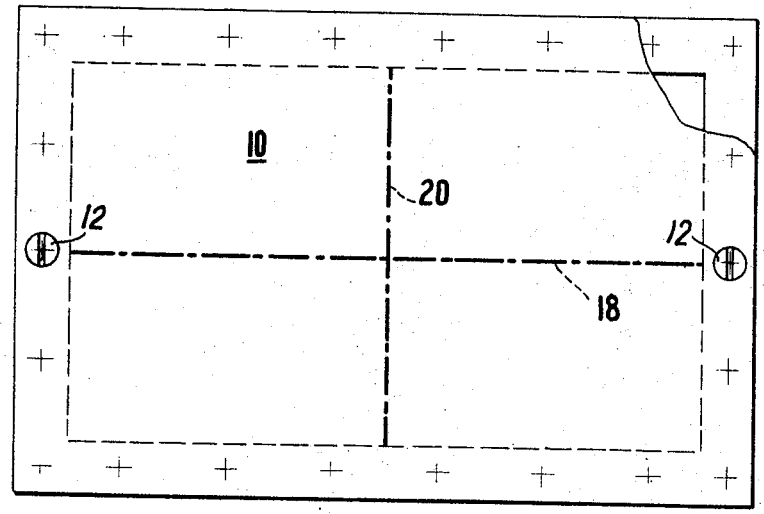
FIG. 2 is an overhead view of FIG. 1 showing diagrammatically the arrangement of the strainer members which are employed at the time of assembly.

FIGS. 1 and 2 show a plate 10 having a substantially rectangular shape, the periphery of which is designed to be rigidly but removably fixed to a frame 14. In the form of embodiment which is illustrated, the fixing means consist of screws such as the screw 12 which are passed through holes formed in the plate and which fit into the frame 14, the major part of which is represented diagrammatically by crosses.

According to the invention, the frame is fitted prior to mounting and fixing of the plate with two cables 18 and 20, both cables being fitted with turnbuckles such as the turnbuckle 16 which are coupled to the frame 14 by means of screws such as the screw 22 and serve to subject the frame 14 to compressive stresses which tend to shrink said frame. For this purpose, the two cables 18 and 20 are placed crosswise as represented diagrammatically in chain-dotted lines in FIG. 2. The tension to be applied on the cables obviously depends on the dimensions of the frame and on the stress which it is desired to induce within the plate, said stress being determined by the load which the plate is designed to withstand. In the case of a frame having large dimensions, a number of cables can of course be placed in parallel, thereby producing action on the same sides so as to tend to draw them closer together. The cables can also be placed diagonally or in any other positions so as to obtain a particular distribution of tensile stresses within the plate.

The number and cross-sectional area of the screws 12 must obviously be also determined as a function of the efforts which they are intended to transmit from the frame to the plate.

When suitable tension has been applied to the cables 18 and 20, the plate 10 is fixed on the frame 12 and the screws are tightened hard up. The turnbuckles are then slackened off and the cables detached. The plate 10 is then subjected to a tensile prestressing which prevents any substantial degree of deflection of said plate as long as the load to which this latter is subjected is not liable to induce any stress which is higher than the prestress applied by the frame.

Figure 3:
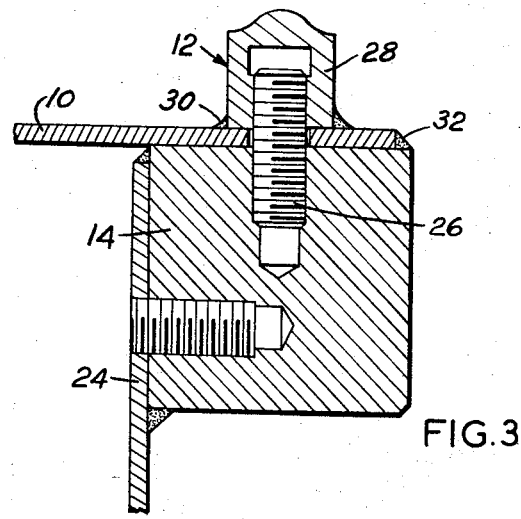
FIG. 3 is a detail view of FIG. 1 showing the junction between frame and plate.

FIG. 3 shows the manner in which leak-tightness can be ensured in respect of the junction between the plate 10 and the frame 14 which is welded to a wall 24 forming, for example, the lateral wall of a leak-tight enclosure. Accordingly, the means 12 consist of studs 26 fitted with nuts 28 and joints packed with sealing compound are formed at 30 and 32. The corners of the plate and of the frame are preferably cut away so as to avoid any inequalities in tension in these portions of the plate.

Although the plate which is illustrated in the drawing is rectangular and the strainer members are placed crosswise, it will be apparent that the invention applies to plates of any shape and that the arrangement of the strainer members depends on the shape of the plate and distribution of stresses which it is desired to obtain. Furthermore, the plate can be attached to the frame by any suitable means other than by screws.

Figure 5:
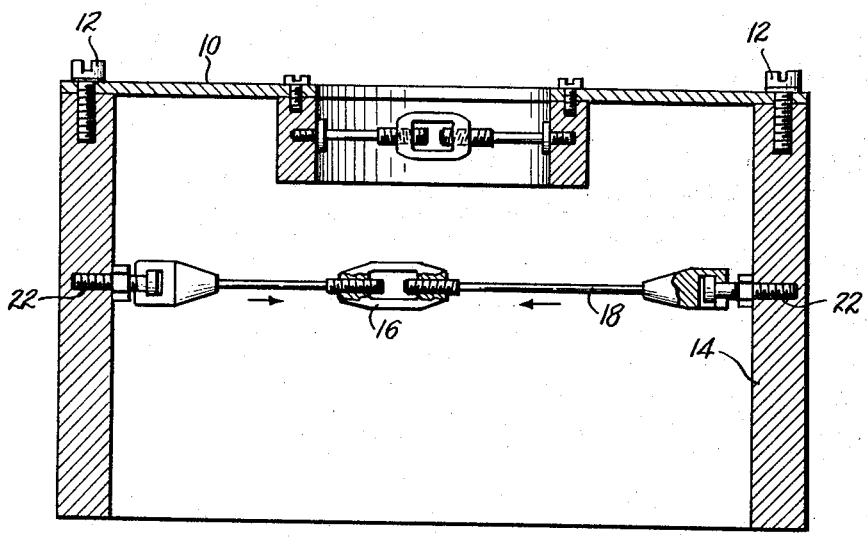
FIG. 5 is a view in cross-section of an alternative embodiment of the invention.

When the plate is pierced with an opening, there can be secured to the edge of the opening a frame as shown in FIG. 5, which is maintained prior to fixing under prestress by jacks, for example, with a resulting tendto enlarge the frame. When the jacks are subsequently removed, the frame will tend to revert to its initial dimensions and will therefore exert a pull on the edges of the opening, in the same manner as the main frame exerts a pull on the edges of the plate.

Figure 4:
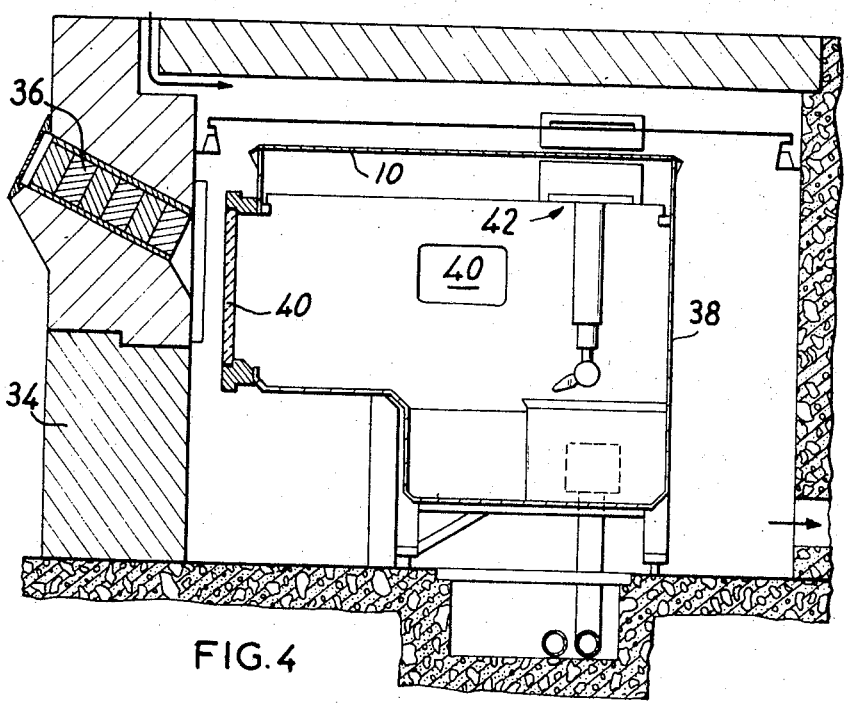
FIG. 4 is a very diagrammatic view, in cross-section along a vertical plane, of a cell fitted with a conveyor which is controlled by a magnetic flux transmitted through a plate according to the invention which forms part of the leak-tight casing of the cell.

By way of example of application of the invention, FIG. 4 shows a hot cell. In this figure, those members which have already been illustrated in FIGS. 1 to 3 are designated by the same reference numerals.

The cell comprises an outer shield structure 34 of substantial thickness, said shield structure being formed of cast iron, for example and fitted with inspection windows such as the window 36. Within said outer shield structure is placed a leak-tight shield casing 38 which is also fitted with inspection windows 40. Provision is made within the casing for a magnetic-transmission manipulator 42 to which further reference will be made hereinafter.

The casing 38 consists of a lateral wall of stainless steel plate which has sufficient rigidity and strength to withstand the reduced pressure which usually prevails within the casing, and a ceiling consisting of a plate 10 of non-ferromagnetic alloy such as steel containing 26.4% nickel, 15% chromium with a small proportion of manganese, molybdenum and titanium and known under the trade name of "Fluginox 130." The said plate is mounted on a frame which is welded to the lateral wall and put under compression by means of tie-rods, said tie-rods being then removed.

The manipulator is, for example, of the type described under the title "Remote Manipulation for Sealed Cells" on page 335 of the August 1962 issue of "Nuclear Engineering" and comprises a driving head above the ceiling and a driven head placed below the ceiling; small wheels carried by the heads maintain these latter at a substantially constant distance: the tensioning of the ceiling prevents the thrust exerted by said wheels from causing any deflection of the ceiling.

What we claim is:

1. A method of obtaining and maintaining a flat surface on a thin diaphragm provided with an opening, said method comprising:

providing a first frame which corresponds to the contour of said diaphragm;

subjecting said first frame to stresses which tend to shrink said frame;

providing a second inner frame which corresponds in shape to the contour of the opening;

tensioning said second frame so as to tend to enlarge said second frame;

rigidly fixing the edge of the diaphragm to said first frame;

rigidly fixing the edge of the opening to said second frame;

and reducing to zero the stresses applied to said frames whereby each said frame tends to revert to its initial shape and to apply tractive efforts along the entire periphery of the diaphragm.

2. A hot cell comprising a leak-tight casing comprising a lateral vertical wall;

a thin horizontal diaphragm formed of a non-ferromagnetic metal;

a rigid frame secured to said wall and adapted to be connected to adjustable means for applying stresses which tend to shrink said frame;

removable means for positively securing the periphery of said diaphragm to said frame at a time when said frame is under stress, whereby said frame, when returned to an unstressed condition, will exert tractive efforts on the complete periphery of the diaphragm in order to maintain said diaphragm in a substantially flat surface;

and a manipulator operated by magnet transmission through said diaphragm.

References Cited

UNITED STATES PATENTS

| 1,524,897 | 2/1925 | Weil | 52—222 |
| 2,364,494 | 12/1944 | Upson | 29—449 |
| 2,973,107 | 2/1961 | Cherel | 214—1 |

ROBERT G. SHERIDAN, *Primary Examiner.*

GERALD M. FORLENZA, *Examiner.*